United States Patent
Zhang et al.

(10) Patent No.: US 9,549,017 B2
(45) Date of Patent: Jan. 17, 2017

(54) PREDICTING CONTENT PERFORMANCE WITH INTEREST DATA

(71) Applicant: Google Inc., Mountain View, CA (US)

(72) Inventors: Xiaonan Zhang, Sunnyvale, CA (US); Shankar Ponnekanti, Mountain View, CA (US); Oren Eli Zamir, Los Altos, CA (US); Ting Liu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 398 days.

(21) Appl. No.: 13/831,110

(22) Filed: Mar. 14, 2013

(65) Prior Publication Data

US 2014/0068011 A1 Mar. 6, 2014

(30) Foreign Application Priority Data

Aug. 29, 2012 (IL) .......................................... 221685

(51) Int. Cl.
*H04L 29/08* (2006.01)
*G06F 17/30* (2006.01)

(52) U.S. Cl.
CPC ......... *H04L 67/02* (2013.01); *G06F 17/30867* (2013.01); *H04L 67/20* (2013.01); *H04L 67/303* (2013.01)

(58) Field of Classification Search
CPC .......... H04L 51/00; H04L 51/24; H04L 51/34; H04L 12/1895; H04L 12/5895; H04L 67/02; H04L 67/20; H04L 67/22; H04L 67/30; H04L 67/306; H04L 51/32; H04L 67/125; H04L 41/5083; G06Q 30/02;G06Q 30/0202; G06Q 30/0251; G06Q 30/0215; G06Q 30/0601; G06Q 50/01; G06Q 10/02; G06Q 40/12; G06Q 30/0241; G06Q 30/0242; G06Q 30/0244; G06Q 30/0261; G06Q 30/0247; G06Q 30/0267; G06Q 30/0269; G06Q 30/0275; G06Q 10/10; G06Q 40/04; G06F 17/30241; G06F 17/30867; G06F 17/30864; G06F 17/30905

See application file for complete search history.

(56) References Cited

U.S. PATENT DOCUMENTS

| | | | |
|---|---|---|---|
| 2007/0033531 A1* | 2/2007 | Marsh | G06Q 30/02 715/738 |
| 2007/0192467 A1* | 8/2007 | Keeler | G06Q 30/0241 709/223 |
| 2007/0220010 A1* | 9/2007 | Ertugrul | 707/10 |
| 2007/0260624 A1* | 11/2007 | Chung | G06Q 30/02 |
| 2008/0139112 A1* | 6/2008 | Sampath et al. | 455/3.04 |
| 2008/0249832 A1 | 10/2008 | Richardson et al. | |
| 2009/0158320 A1* | 6/2009 | Riedl et al. | 725/34 |

(Continued)

*Primary Examiner* — Sargon Nano
*Assistant Examiner* — Michael Li
(74) *Attorney, Agent, or Firm* — Foley & Lardner LLP; John D. Lanza; James De Vellis

(57) ABSTRACT

Systems and methods for predicting content performance with interest data include receiving a content selection request that includes a client identifier. One or more topical interest categories associated with the client identifier may be used as inputs to a prediction model to predict the likelihood of an online action occurring as a result of third-party content being selected. The predicted likelihood may be used to select third-party content.

17 Claims, 5 Drawing Sheets

(56) References Cited

U.S. PATENT DOCUMENTS

| | | |
|---|---|---|
| 2009/0182589 A1* | 7/2009 | Kendall ................. G06Q 10/02 |
| | | 705/5 |
| 2010/0138271 A1 | 6/2010 | Henkin et al. |
| 2010/0191692 A1* | 7/2010 | Gassewitz et al. ............. 706/47 |
| 2010/0198503 A1* | 8/2010 | Beckner et al. .............. 701/207 |
| 2011/0196733 A1 | 8/2011 | Li et al. |
| 2011/0264511 A1 | 10/2011 | Zhang |
| 2011/0313844 A1 | 12/2011 | Chandramouli et al. |
| 2012/0022952 A1 | 1/2012 | Cetin et al. |
| 2012/0123867 A1* | 5/2012 | Hannan .............. G06Q 30/0261 |
| | | 705/14.58 |

* cited by examiner

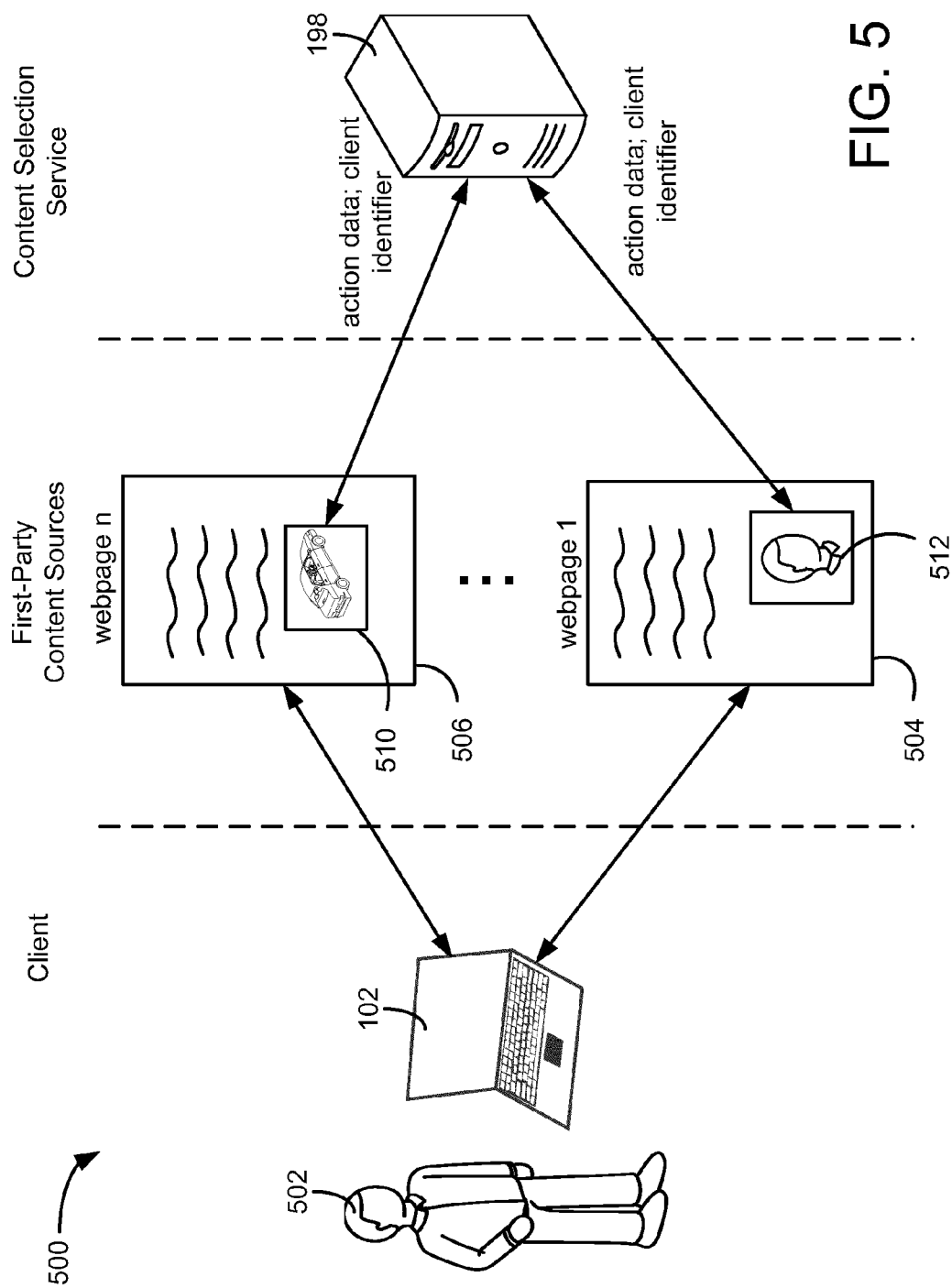

PREDICTING CONTENT PERFORMANCE WITH INTEREST DATA

The present application claims foreign priority to Israeli Patent Application No. 221,685, entitled "PREDICTING CONTENT PERFORMANCE WITH INTEREST DATA," and filed Aug. 29, 2012, the entirety of which is hereby incorporated by reference.

BACKGROUND

The present disclosure generally relates to the selection of content for a client device. The present disclosure more particularly relates to predicting the likelihood of interactions with the selected content.

Online content may be available regarding any number of disparate topics. For example, a first website on the Internet may be devoted to the migratory habits of barn swallows and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

SUMMARY

One implementation described herein relates to a method of selecting an provider content for display based on stored user interest data. The method includes receiving, at a processing circuit, a content selection request for third-party content to be presented by a client device in conjunction with first-party content, the content selection request including a client identifier. The method also includes retrieving data indicative of one or more topical interest categories associated with the client identifier. The method further includes identifying, by the processing circuit, one of the topical interest categories as an input for a prediction model. The method additionally includes selecting, by the processing circuit, a set of third-party content eligible for selection based in part on the one or more topical interest categories associated with the client identifier and based in part on a topic of the third-party content. The method also includes using the prediction model to predict a predicted action metric for the third-party content in the set, the predicted action metric corresponding to a predicted likelihood of an online action occurring as a result of the third-party content being selected. The method further includes selecting, by the processing circuit, third-party content from the set based in part on the predicted action metric associated with the third-party content. The method yet further includes providing, by the processing circuit, an indication of the selected third-party content to be presented in conjunction with the first-party content.

Another implementation relates to a system for selecting content. The system includes a processing circuit operable to receive a content selection request for third-party content to be presented by a client device in conjunction with first-party content, the content selection request including a client identifier. The processing circuit is also operable to retrieve data indicative of one or more topical interest categories associated with the client identifier. The processing circuit is further operable to identify one of the topical interest categories as an input for a prediction model. The processing circuit is additionally operable to select a set of third-party content eligible for selection based in part on the one or more topical interest categories associated with the client identifier and based in part on a topic of the third-party content. The processing circuit is also operable to use the prediction model to predict a predicted action metric for the third-party content in the set, the predicted action metric corresponding to a predicted likelihood of an online action occurring as a result of the third-party content being selected. The processing circuit is additionally operable to select third-party content from the set based in part on the predicted action metric associated with the third-party content. The processing circuit is further operable to provide an indication of the selected third-party content to be presented in conjunction with the first-party content.

Yet another implementation described herein relates to a computer-readable storage medium having machine instructions stored therein, the instructions being executable by a processor to cause the processor to perform operations. The operations include receiving a content selection request for third-party content to be presented by a client device in conjunction with first-party content, the content selection request including a client identifier. The operations also include retrieving data indicative of one or more topical interest categories associated with the client identifier. The operations further include identifying one of the topical interest categories as an input for a prediction model. The operations yet further include selecting a set of third-party content eligible for selection based in part on the one or more topical interest categories associated with the client identifier and based in part on a topic of the third-party content. The operations additionally include using the prediction model to predict a predicted action metric for the third-party content in the set, the predicted action metric corresponding to a predicted likelihood of an online action occurring as a result of the third-party content being selected. The operations also include selecting third-party content from the set based in part on the predicted action metric associated with the third-party content. The operations further include providing an indication of the selected third-party content to be presented in conjunction with the first-party content.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings and the claims.

FIG. 5 is an illustration of content being selected by a content selection service.

DETAILED DESCRIPTION

Figure 1:
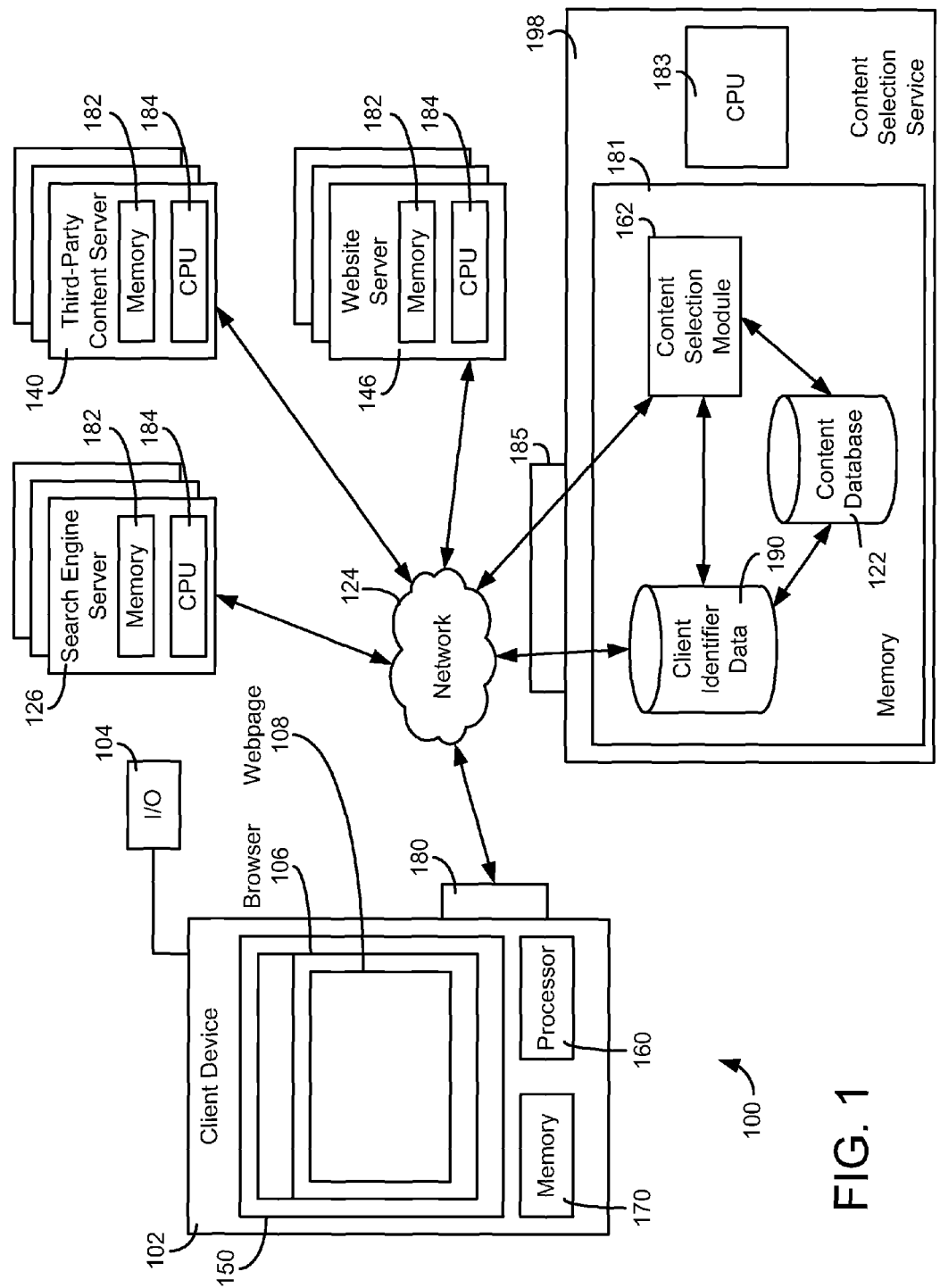
FIG. 1 is a schematic diagram of a computer network.

Before describing in detail the particular implementations, it should be observed that the invention includes, but is not limited to a novel structural combination of data processing components and communications networks, and not in the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular implementations depicted in the exemplary diagrams, but should be construed in accordance with the language in the claims.

According to some aspects of the present disclosure, first-party and third-party content may be provided to a client device. As used herein, first-party content refers to the primary online content requested or displayed by the client device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or advertisement that appears in conjunction with a requested webpage (e.g., a search result webpage from a search engine, a webpage that includes an online article, a webpage of a social networking service, etc.) or within a stand-alone application (e.g., an advertisement within a game). Generally, a first-party content provider is a content provider that allows another content provider (i.e., a third-party content provider) to provide content in conjunction with that of the first-party. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

A first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different third-party content during different visits to the webpage. The content selection service may determine which third-party content is to be provided based on any number of factors (e.g., whether the third-party content and first-party content relate to the same topic). For example, a third-party advertisement for golf clubs may appear on a webpage devoted to reviews of golf resorts. The content selection service may also conduct a content auction to select the third-party content to be provided from among the various third-party content providers.

According to various implementations, a content selection service may be configured to select third-party content based on its potential relevance to a particular user. With the user's permission, the content selection service may represent the user as an anonymized user identifier. In general, a user identifier refers to any form of data that may be used to represent a user. In some implementations, a user identifier may be a client identifier that represents the user's client device to the content selection service. A client identifier may be, but is not limited to, a cookie set on the client device, a hardware-based identifier for the client device, a universally unique identifier (UUID) for an application installed on the client device, or a telephone number for the client device. In further implementations, a user identifier may be associated with one or more client identifiers. For example, a user identifier may be associated with a cookie set via the client device's web browser and a UUID for a game installed on the client device. Since the cookie and UUID are associated with the same user identifier, the content selection service may select third-party content for the client device, regardless of whether the third-party content is to be provided in conjunction with the game or a visited webpage.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by a content selection service and presented to the user. Certain data, such as a user identifier, may be anonymized in one or more ways before it is stored or used, so that personally identifiable information is removed when generating parameters (e.g., demographic parameters) used by the content selection service to select third-party content. For example, a user identifier may be anonymized so that no personally identifiable information about its corresponding user can be determined from it. In another example, a user's geographic location may be generalized where location information is obtained (such as to a city, ZIP code, or state level), so that a precise location of the user cannot be determined. Thus, the user may have control over how information is collected about him or her and used by the content selection service.

In some implementations, history data indicative of online actions performed by the user may be analyzed by a content selection service to determine potential interests of the corresponding user. Exemplary online actions include, but are not limited to, visiting a webpage devoted to a particular topic and interacting with third-party content selected by the content selection service. For example, the content selection service may receive history data for a user identifier that indicates that ten webpages devoted to golf were visited by the user identifier. In such a case, the content selection service may associate the user identifier with a golf-related interest category (e.g., by generating a database table entry that links the user identifier to the interest category). The content selection service may then select third-party content for the user identifier based in part on its associated interest category. For example, the content selection service may select third-party content related to golf to be presented in conjunction with a first-party webpage or application. Thus, the content selection service may select third-party content that may be of relevance to a particular user.

One or more implementations described herein provides a method that allows a processing circuit to analyze history data for a user identifier to predict the likelihood that a particular piece or type of third-party content will result in the user performing a given online action (e.g., interacting with the third-party content, making a purchase at the third-party content provider's website, etc.). In some implementations, a content selection service may determine a predicted click-through rate (pCTR) representing the likelihood of the user clicking on the third-party content. In further implementations, a content selection service may determine a predicted conversion rate (pCVR). Generally, a conversion refers to any specified type of online action performed by a user after being presented the third-party content. For example, a conversion may correspond to the user clicking on the third-party content and making a purchase at the third-party content provider's website, signing up for an online newsletter, downloading software, etc. Based on these or other predicted action metrics, the content selection service may select third-party content for a user identifier.

Referring to FIG. 1, a schematic diagram of a computer system 100 is shown, according to one example. Websites stored on servers 126 or 146, for example may be accessible by a client device 102 through network 124. Network 124 may include a local area network (LAN), wide area network (WAN), a telephone network, such as the Public Switched Telephone Network (PSTN), a wireless link, an intranet, the Internet, or combinations thereof. Client device 102, may be a mainframe, minicomputer, personal computer, laptop, tablet computer, set-top box for a television set, a smart television, a personal digital assistant (PDA), cell phone, or any other consumer electronic device configured to retrieve content via a network. Client device 102 may include a processor 160, a memory 170, a network interface 180, one or more user input devices 104 as well as a display 150. Display 150 is in electronic communication with one or more processors that cause visual indicia to be provided on display 150. Display 150 may be located inside or outside of the housing of the one or more processors. For example, display 150 may be external to a desktop computer (e.g., display 150 may be a monitor), may be a television set, or any other stand-alone form of electronic display. In another example, display 150 may be internal to a laptop computer, mobile device, or other computing device with an integrated display.

In general, a client device 102 may be any type of processor-based device that is connected to a network 100 and executes one or more applications. Such an application, such as a web browser, may be configured to retrieve first-party content from a first-party content source, such as a search engine server 126 or a website server 146. In some cases, an application running on client device 102 may itself be first-party content (e.g., a game, a media player, etc.). In one example, client device 102 may execute a web browser application which provides a browser window 106 on display 150. The web browser application that provides browser window 106 may operate by receiving input of a uniform resource locator (URL), such as a web address, from an input device 104 (e.g., a pointing device, a keyboard, a touch screen, or another form of input device). In response, one or more processors 160 executing the web browser may request data from another device connected to network 124 at the URL address (e.g., search engine server 126, third-party content server 140, website server 146, content selection service 198). The other device may then provide web page data and/or other data to the client device 102, which causes visual indicia to be displayed by display 150. Accordingly, browser window 106 displays retrieved first-party content such as web pages from various websites to facilitate user interaction with the web pages.

Computer system 100 may also include any number of computing devices that provide content to client device 102. As shown, computer system 100 may include any number of first-party content providers, such as one or more website servers 146 and one or more search engine servers 126. Computer system 100 may also include a third-party content server 140. Each of servers 126, 140, 146 may include processors 184 configured to execute instructions stored in memory devices 182. Computer system 100 may also include a content selection service 198, which may be one or more computing devices. Content selection service 198 may include a processor 183 that executes instructions stored in a memory 185. In other words, the one or more processors 184 and memory devices 182 of content selection service 198 may form a processing circuit. Content selection service 198 may also include an interface 181 configured to receive data via network 124 and to provide data from content selection service 198 to any of the other devices on network 124.

A first-party content provider, such as the operator of search engine server 126, website server 146, or a provider of an application running on client device 102 may allow content selection service 198 to select third-party content to be provided in conjunction with the first-party content, according to various implementations. In one example, a user of client device 102 may access various websites through network 124 (e.g., from website servers 146, search engine server 126, etc.). A retrieved web page 108 of an accessed website may be displayed by display 150 in browser window 106. According to some implementations, the provider of webpage 108 may allow content selection service 198 to select third-party content to be provided to client device 102 and displayed in conjunction with webpage 108 (e.g., embedded on webpage 108, in a pop-up window, etc.). Content selection service 198 may then select third-party content, such as content from third-party server 140, for presentation with webpage 108.

In some implementations, webpage 108 may include one or more content tags that, when executed by the web browser of client device 102, causes client device 102 to send a content selection request to content selection service 198. Such a request may include a client identifier used by content selection service 198 to identify client device 102. A client identifier may be an Internet protocol (IP) address or other unique client identifier (a device serial number, UUID, telephone number, etc.) associated with client device 102. The client identifier may be anonymized such that the identity of the actual user of client device 102 is inaccessible to content selection service 198. Thus, content selection service 198 may receive history data regarding client device 102 visiting webpage 108. Content tags in first-party content on client device 102 may cause client device 102 to generate data regarding any number of online actions (e.g., whether the user of client 102 clicked on the third-party content, whether the user of client 102 performed a specific action on the third-party provider's website, etc.).

Content selection service 198 may store data regarding third-party content from third-party server 140 in content database 122. In some implementations, content selection service 198 may perform image and/or text recognition on the third-party content to detect one or more topics of the third-party content. For example, assume that the third-party content from third-party server 140 is a hotlinked image of a golfer. In such a case, the topic of golf may be associated with the image in content database 122. In some implementations, content database 122 may also include the third-party content itself. In other words, content selection service 198 may provide the selected third-party content to client device 102 directly via network 124. In other implementations, content selection service 198 may instead provide a command to client device 102 that causes the device to retrieve the selected third-party content (e.g., from third-party server 140, from memory 170, etc.).

Figure 4:
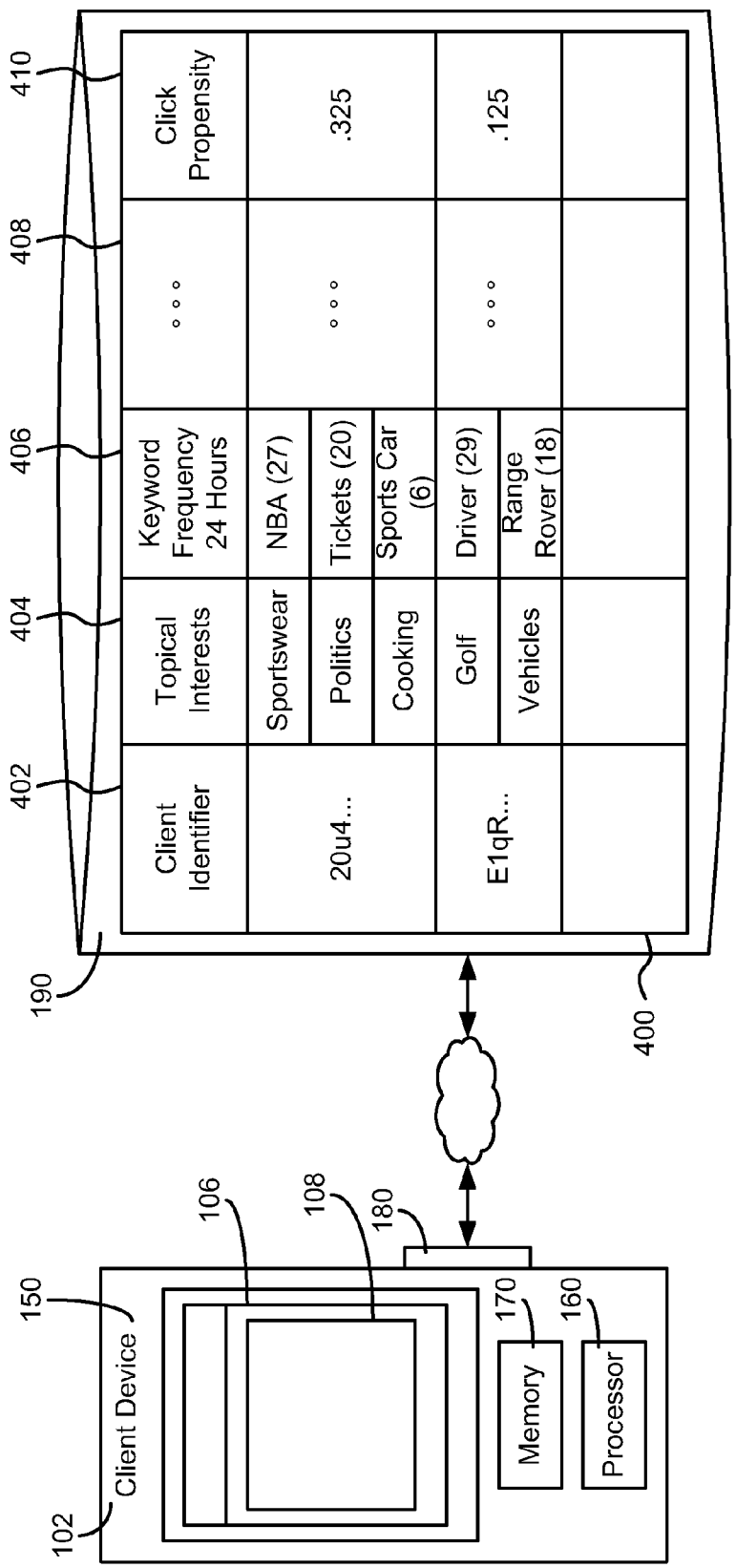
FIG. 4 is a more detailed view of a database storing a client identifier profile, according to one illustrative embodiment.

In addition to storing data regarding the various third-party content in content database 122, content selection service 198 may also store client identifier data 190 in memory 181. Client identifier data 190 generally includes data regarding online actions performed by a particular client identifier. History data received by content selection service 198 may be used by content selection service 198 to generate a profile for a client and/or user identifier. Such a profile may include, for example, webpage topics of webpages visited by the identifier. Profile database 400 in FIG. 4 depicts a more detailed view of one example of the contents of client identifier data 190. Client identifier database 400 may include entries associating a client identifier 402 with any number of types of data derived by analyzing the history data (e.g., and corresponding online actions) for the identifier. Exemplary data that may be associated with a client identifier 402 include data regarding topical interests 404 (e.g., based on the topics of webpages visited by the identifier), keyword frequency, and one or more metrics 410 regarding the corresponding user's propensity to perform an online action (e.g., the rate at which the user clicks on third-party content, etc.).

According to various implementations, the content of a web page may be parsed for keyword terms to determine what category of product, service or topic the web page is related to. For example, content selection service 198 may extract keyword terms and determine a category for a web page based on the keyword terms. In general, a category may be a set of words that convey the same or similar ideas. A word category may be a set of synonyms, according to one embodiment. For example, the text of a web page may include the word "hotel." A word category that includes the word "hotel" may be as follows:

category_1={inn, hotel, hostel, lodge, motel, public house, spa}

Such a category may be used to identify web pages devoted to the same topic, but use different terminology to do so. Accordingly, each time a client device 102 requests a web or directly transmits data to content selection service 198, content selection service 198 may analyze the history data to update the profile data associated with a client identifier. For example, the analyzed content may include a client identifiers most frequently viewed web page categories in general, a client identifier's most frequently viewed web page categories in the short term (e.g., the last 24 hours, the last 5 minutes, or the web page currently being viewed), a client identifiers most frequently viewed web page categories in the long term (e.g. the last week or the last month), most frequently viewed keywords, propensity to click on third-party content, and other form of metrics, for example. In various implementations, the short-term browsing history for a client identifier surrounding an event may include data about the web pages visited by the client identifier less than one, two, five, twelve, or twenty four hours prior to the event. In some implementations, long-term browsing histories may be used (e.g., browsing history data from a period longer than the particular period associated with the short-term browsing history). The short-term browsing histories may also be determined for the entire set of client identifiers or for a subset of the client identifiers (e.g., a random sampling of the client identifiers, a subset selected up to a predetermined amount of client identifiers, etc.).

Content selection service 198 may further include a content selection module 162 configured to model the likelihood of the user of client device 102 performing a given type of online action, should a particular piece of third-party content be selected. In various implementations, content selection module 162 may use the various data in client identifier data 190 and content database 122 as inputs to a predictive model, such as a linear regression model. For example, content selection module 162 may generate a pCTR or pCVR for third-party content eligible for selection for client device 102. Content selection service 198 may use such a metric in the content selection process. For example, content selection service 198 may select a piece of third-party content having a higher pCTR for presentation at client device 102 over third-party content having a lower pCTR (e.g., the service may select content most likely to be interacted with by the user of client device 102).

Figure 2:
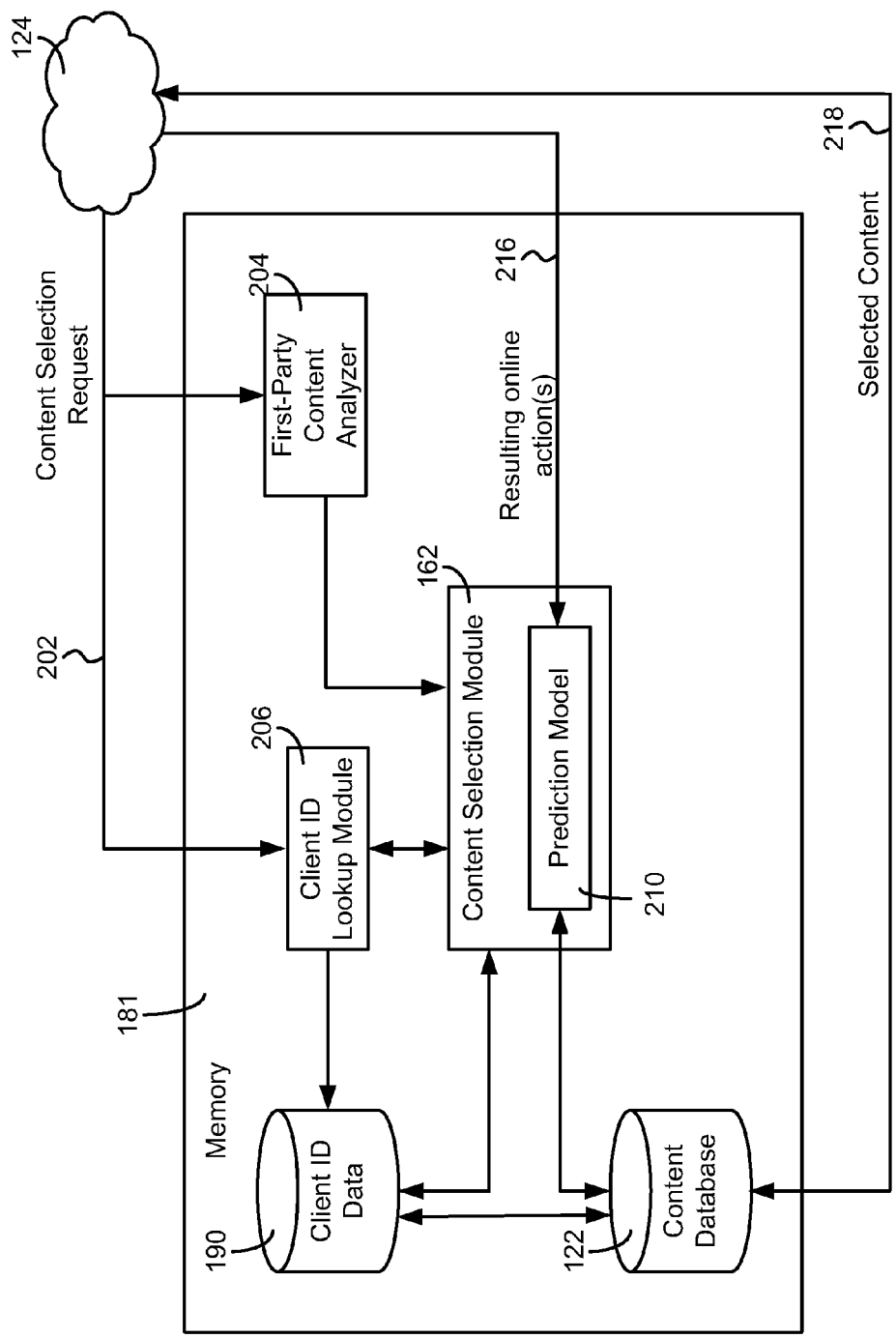
FIG. 2 is a schematic diagram of a content selection system according to one illustrative implementation.

Referring now to FIG. 2, content selection module 162 is shown in more detail. When a content selection request 202 is received by content selection service 198 from network 124, the request may include data regarding the first-party content that caused client device 102 to send the request. According to some implementations, request 202 is received at a first-party content analyzer 204 and a client identifier lookup module 206. First-party content analyzer 204 may perform character and/or image recognition on the corresponding first-party content. First-party content analyzer 204 may also determine one or more topical categories and associate the categories with the first-party content (e.g., in content database 122). Content selection request 202 may also include a client identifier used by a client identifier lookup module 206 to retrieve and update profile data in client identifier data 190.

According to various implementations, content selection module 162 includes a prediction model 210 configured to model and predict the likelihood of online actions regarding third-party content eligible for selection by the content selection service. Prediction model 210 may receive as input data regarding one or more topics of the first-party content from first-party content analyzer 204. Prediction model 210 may also receive as input data associated with the client identifier making content selection request 202. For example, prediction model 210 may receive input data from client identifier data 190 indicative of long-term interest categories associated with the client identifier, an indication or measurement of how well the topic of eligible third-party content matches an interest category associated with the client identifier, how long the user identifier has been associated with the interest category, or an action metric associated with the user identifier (e.g., a measurement of how frequently the user clicks on third-party content selected by the service, a measurement of a how frequently the user performs a conversion, etc.). In various implementations, prediction model 210 may output a pCTR or pCVR value.

Client identifier data 190 may be used by content selection module 162 to select a first round of predetermined number of advertisements (e.g. 1,000 advertisements relevant to a client identifier) to be rated using prediction model 210. For example, prediction model 210 may determine a pCTR for each of the predetermined number of pieces of third-party content eligible for selection. Content selection module 168 may then select the third-party content with the highest pCTR or select third-party content having a pCTR above a predetermined threshold (e.g., select from amongst a set of third-party content with a pCTR above 0.15). Various predictive models may be as prediction model 210. According to various implementations, a logistic regression, linear regression, naïve Bayesian, or other predictive approach may be used to predict how a client identifier will interact with a particular piece of third-party content. In some implementations, an artificial neural network can be trained using one or more of the user interest data, web page content data, and third-party content data stored in content selection service 198.

Client identifier data 190 may forward a set of characteristics such as web page categories previously provided to a client identifier. These characteristics may be used to select a first round of matching third-party content prior to evaluating the advertisements at prediction model 210. These matching advertisements may have a predetermined limit, such as 100, 1,000 or 10,000, for example to limit processing time required at prediction model 210. According to some implementations, characteristics for each of the matching pieces of third-party content are entered into the prediction model 210 and a pCTR is generated for each of the matching content. Once pCTR scores are generated, content selection module 162 may select content 218 based in part on its pCTR score. Content selection service 198 may then return either content 218 to the device that sent content selection request 202 or an indication of the selection. For example, content 218 may be provided to client 102 for presentation with webpage 108 on display 150. In addition, once a user either interacts with content 218 or performs another such online action (e.g., making an online purchase, etc.), prediction model 210 may receive an indication 216 of the resulting online actions. Thus, prediction model 210 may be configured to adjust its predicted action metrics using feedback from the client devices. For example, if prediction model 210 gave a high score to a piece of third-party content that was displayed to a user but was not clicked, prediction model 210 may adjust downward the weight of variables that contributed to determining the content warranted a high score.

According to various implementations, prediction model 210 uses a logistic regression model to determine a pCTR and/or pCVR for a variety of pieces of third-party content. In general, a logistic regression function may be defined as shown in equation (1):

$$f(z) = \frac{1}{1+e^{-z}} \quad (1)$$

wherein f(z) represents the probability of an outcome (e.g., a value between 0 and 1), such as the probability that the user associated with a client identifier will click on the third-party content, given a set of factors represented by z. For example, the data regarding the third-party content (e.g. keywords or topical categories associated with the third-party content for which the pCTR is being calculated), first-party content data (e.g. keywords or categories of interest associated with the web page or application with which the third-party content is to be provided), and client identifier data (e.g., short term interests categories, long term interest categories, most frequently viewed keywords, or metrics on how likely the identifier is to perform a given online action) may all be used as inputs $(x_i \ldots x_k)$ reflected in z. Hence, the value of z may be defined as shown in equation (2):

$$z=\beta_0+\beta_1 x_1+\beta_x x_2+\ldots+\beta_k x_k \quad (2)$$

wherein $\beta_0$ is the y-axis intercept, $x_i$ is an input variable affecting the probability outcome, and $\beta_1$-$\beta_k$ are a regression coefficients or weights (e.g., determining how much each variable $x_1$ affects the outcome). Variable coefficients $\beta_1$, $\beta_2$, $\beta_3$, etc. are used to weigh the importance of each input variable according to its overall effect on probability output. A large regression coefficient means that the risk factor strongly influences the probability of that outcome, while a near-zero regression coefficient means that that risk factor has little influence on the probability of that outcome. In some implementations, the inputs to the model may be cross products of input values (e.g., a topic of the first-party content crossed with the topic of the third-party content, etc.).

Training of the logistic regression model may be achieved by comparing the predicted outcome (e.g., a pCTR or pCVR), such as a predicted likelihood that a particular client identifier will click on third-party content 218 with the real world result 216. According to some implementations, the comparison will provide a measurement of error that can be used to adjust the regression coefficients or weights $\beta_1$-$\beta_k$, to minimize the measurement of error. For example, a gradient-descent or other numerical optimization method may be used to adjust regression coefficients or weights $\beta_1$-$\beta_k$ so that this error measure reaches a (local) minimum. This training may accept results 216 from a large number of clients 102 such that the logistic regression model is continually updated for all content selections to continually increase the accuracy of the model.

Figure 3:
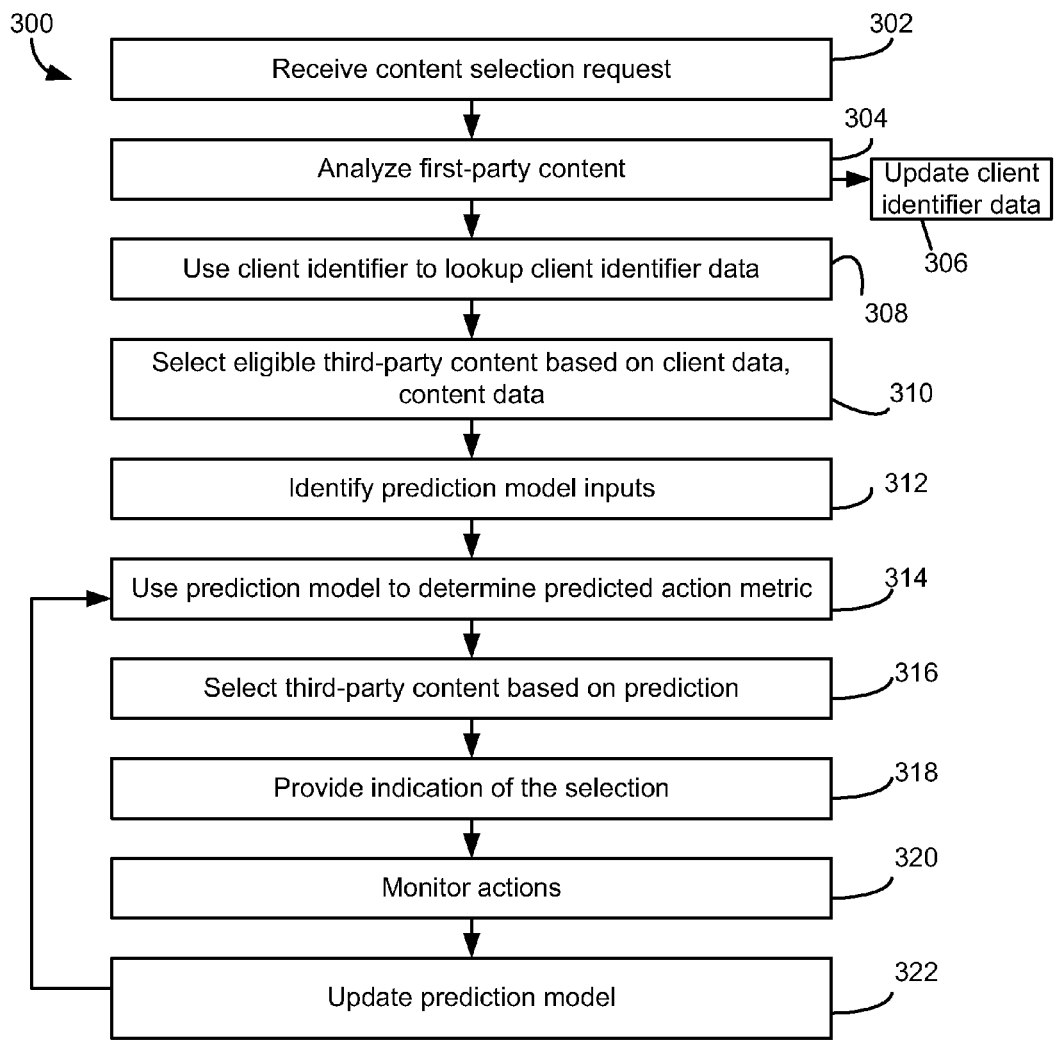
FIG. 3 is an example flow chart of a process for selecting content according to one illustrative implementation.

Referring now to FIG. 3, a process 300 for selecting third-party content for a user identifier is shown. According to various implementations, process 300 is implemented by instructions stored in memory 181 of content selection service 198 and executed by processor 183. In other implementations, process 300 may be implemented in a distributed fashion by any number of computing devices.

Process 300 may include receiving a content selection request (block 302). In various implementations, the content selection request may include, or may be accompanied by, a client identifier. For example, a content selection request may include a UDID of the requesting device or a cookie set on such a device. The content selection request may also include data regarding the first-party content with which the selected third-party content is to be presented. A content selection request may be generated by a client device in response to executing a content tag on a visited webpage, in some implementations. Referring briefly to FIG. 1, for example, when the user of a client device 102 provides browser window 106 with a uniform resource locator (URL), the browser application 106 may request a web page from website server 146. The requested web page 108 may contain computer code such as a content tag. When executed by client device 102, such code may cause client device 102 to send a content selection request to content selection service 198. Other exemplary sources of a content selection request also include first-party applications (e.g., games, messenger programs, social networking applications, etc.) running on a client device and first-party content providers.

Process 300 may include analyzing the first-party content associated with the content selection request (block 304). In various implementations, the first-party content may be analyzed using image and/or text recognition to determine a topic of the first-party content. In other implementations, a topic may be self-identified by the first-party content. For example, a content tag of a webpage may include metadata regarding the topic of the webpage. Related data, such as a keyword count, may also be determined as part of the analysis. Based on the analysis, content data may be generated and stored regarding the first-party content. For example, a particular webpage may be identified as being related to the interest category of golf, based on the content of the webpage. Similarly, the interest profile for the user identifier of the content selection request may also be updated to reflect the topic of the first-party content (block 306).

Process 300 may include using the client identifier to lookup and retrieve data associated with the client identifier (block 308). The retrieved data may include, but is not limited to, identified long term interest categories, short term interest categories, and metrics regarding the identifier's online actions. For example, the retrieved data may include a metric regarding the overall percentage of third-party content that was clicked by the identifier over a given time period or over an unlimited amount of time. In general, the retrieved client identifier data may include any data derived from history data associated with the identifier (e.g., data indicative of webpage visits, content interactions, etc.). For example, as shown in FIG. 4, client identifier data 190 may include various data associated with client identifiers. As shown in client identifier column 402, the client identifier may be a cookie or UDID, for example. Each client identifier may include additional identification data such as a telephone number, for example. Database 400 as shown in FIG. 4 may include any number of client data fields 404-410 (e.g., a first through nth field) determined from analyzing received history data for the identifier. For example, "topical interests" data field 404 refers to the most frequent or strongest topical categories of the first-party content requested by client identifier 402. "Keyword frequency 24 hours" data field 406 refers to the keywords extracted from web pages or other first-party content received by the client identifier in the last 24 hours. Click propensity data field 410 may be a measure of how often the client identifier clicks third-party content selected by the content selection service for them. Click propensity data field 410 may be a standalone measurement or may be a relative indication of click propensity comparing a single client identifier against other client identifiers, according to some implementations.

Referring again to process 300, once client identifier data has been accessed, the variety of data points and metrics for the identifier may be used to determine a set of one or more pieces of third-party content eligible for presentation to the identifier (block 310). Such a set may include all of the third-party content available to the selection service. In other cases, the set may be based in part on a match between an interest category associated with the client identifier and a topic of the third-party content. For example, the set may include third-party content related to golf for a user identifier associated with a golf-related interest category. In further cases, the set may be based in part on a match between a topic of the third-party content and the first-party content. For example, assume that a content selection request requests third-party content to be embedded on golf-related webpage. In such a case, the set of eligible third-party content may include golf-related content. In further implementations, the set of eligible third-party content may be based in part on one or more preferences set by a third-party content provider. For example, some third-party content providers may specify to the selection service that they wish to provide their content to user identifiers associated with a specific interest category.

Process 300 may include identifying prediction model input parameters for the one or more pieces of third-party content in the set of content eligible for selection. The retrieved client identifier data may be used as input parameters, in some implementations. For example, some or all of category of user interest data such as topical interest categories 404 (e.g., long-term interests, short-term interests, etc.), keyword frequency 406, click propensity 410, etc. may be used as inputs to the prediction model. Additional parameters may include, but are not limited to, how long the identifier has been associated with a particular interest category, a measure of how well a topic of the eligible third-party content matches an interest category associated with the client identifier, and how long the interest category has been associated with the identifier.

Process 300 includes using a prediction model to determine a predicted action metric for the one or more pieces of third-party content in the set of eligible content (block 314). In general, an action metric corresponds to a measure of the likelihood of a particular type of online action occurring as a result of the selection service selecting a type or piece of third-party content. Prediction models used by the content selection service may include linear regression models, logistic regression models, neural networks, or Bayesian networks. Online actions may include, but are not limited to, an interaction with the third-party content (e.g., clicking on the content, playing the content, etc.) and performing a conversion (e.g., making a purchase from the third-party provider's website, signing up to receive messages from the provider, downloading software from the provider, etc.). For example, assume that a third-party advertisement includes a hotlink configured to redirect a web browser or other application to the advertiser's website when clicked. In such a case, a conversion may correspond to the user clicking on the advertisement, being redirected to the advertiser's website, and completing a purchase from the advertiser. A predicted action metric may represent the likelihood of the corresponding action occurring, should the service select the third-party content. For example, a pCTR value may represent the likelihood of a user clicking on the third-party content and a pCVR value may represent the likelihood of the user performing a conversion. A predicted action metric may be on any scale (e.g., zero to one, one to ten, 1-100, etc.). In some implementations, a predicted action metric may be a probability value. For example, a piece of third-party content having a pCTR of 0.15 has a predicted probability of 15% that the user identifier will click on the content, if selected by the service.

Process 300 includes selecting third-party content based in part on the predicted action metric (block 316). Once the third-party content in the set of eligible content have received predicted action metrics, one of the pieces of third-party content may be selected based in part on its predicted action metric. For example, assume that one piece of third-party content has a pCTR of 0.15 and a second piece has a pCTR of 0.10. In such a case, the first piece of content may be selected based on its higher predicted likelihood of the user interacting with the content. In some implementations, the content selection service may conduct a content auction in which the third-party content providers submit bids for the ability to provide their content to the client identifier. in such cases, the selection may also be based in part on the bids. For example, a piece of third-party content having a higher bid but a slightly lower predicted action metric may be selected by the content selection service. In some implementations, the selection service may require that the third-party content must have a predicted action metric over a threshold value to be selected, regardless of its bid.

Process 300 includes providing an indication of the selection (block 318). According to various implementations, the indication may be provided to the client device, a first-party content source, or a third-party content source. In some implementations, the indication may correspond to a command to retrieve the selected third-party content. For example, a client device may retrieve the selected third-party content from a third-party content source or from a local memory (e.g., a cache of third-party content on the client device), in response to receiving such a command. In another example, a command may be sent to the first-party content source to retrieve the selected third-party content (e.g., a first-party webpage may directly embed the selected third-party content and provide both types of content to a client device). In further implementations, the indication may be the selected third-party content itself. For example, the content selection service may provide the selected third-party content to a client device that originated the content selection request.

Process 300 may include monitoring the results of selecting the third-party content (block 320). In various implementations, the third-party content and/or the first-party content with which it is presented may be configured to detect and report a content interaction with the third-party content. For example, a client device may provide an indication that the third-party content was clicked back to the content selection service. In further implementations, a website of the third-party provider may be configured (e.g., via content tags) to report the online actions of the client identifier on the website. For example, content tags on the third-party provider's website may be configured to report on whether the client device is used to make a purchase, sign up for a marketing list, download software, or perform any other online action. In some implementations, the content selection service may use a time threshold to determine whether the third-party content was clicked. For example, the content selection service may determine that the user did not click on the third-party content if an indication of a click is not received within a certain amount of time.

Process 300 may include updating the prediction model using the monitored results (block 322). Prediction model optimization based on the monitored results may be carried out according to online gradient descent optimization, Stochastic gradient descent optimization, etc. In other words, the prediction model may receive feedback and use the feedback to adjust the prediction model for future predictions.

Referring now to FIG. 5, an illustration 500 is shown of content being selected by a content selection service, according to one example. As shown, a user 502 may operate client device 102 to request any number of webpages 504-506 (e.g., a first through nth webpage) from first-party content sources. Webpages 504-506 may include one or more content tags configured to cause client device 102 to send a content selection request to content selection service 198. Such a request may include a client identifier for client device 102. In response, content selection service 198 may retrieve data for the client identifier, such as associated interest categories, click propensity metrics, etc. Content selection service 198 may use this data as an input to a prediction model to determine one or more predicted action metrics for third-party content. Based in part on the predicted action metric, content selection service 198 may select and return third-party content, such as third-party content 510, 512 to be included on first-party webpages 504-506.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, BLU-RAY™ or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of selecting content, comprising:
   receiving, at a processing circuit, a content selection request for third-party content to be presented by a client device in conjunction with first-party content, the content selection request including a client device identifier;
   retrieving data indicative of a set of one or more topical interest categories associated with the client device identifier;
   identifying, by the processing circuit, input values for a prediction model, the input values including:
      the set of topical interest categories,
      a click propensity metric associated with the client identifier, the click propensity metric indicative of how often the client device submitted clicks on previously selected third-party content, and
      a length of time each topical interest category has been associated with the client device identifier, wherein a length of time greater than a defined time period indicates a long-term topical interest category and a length of time less than the defined time period indicates a short-term topical interest category;
   performing, by the processing circuit, one or more of image recognition or text recognition on each of a set of third-party content to determine a topical interest category;
   selecting, by the processing circuit, a subset of third-party content eligible for selection based in part on the set of topical interest categories associated with the client device identifier, a topical interest category of each of the subset of third-party content, and a topic of first party content;
   using the prediction model that includes a logistic regression model to predict, based on the input values including the length of time, a predicted action metric for the third-party content in the subset, the predicted action metric corresponding to a predicted likelihood of an online action occurring as a result of the third-party content being selected, the logistic regression model indicating the predicted likelihood of the online action as $$f(z) = \frac{1}{1+e^{-z}},$$

wherein f(z) indicates the predicted likelihood of the online action, z indicates a set of factors including the length of time each topical interest category has been associated with the client device identifier, and wherein the predicted action metric includes at least one of a predicted click-through rate or a predicted conversion rate;
   selecting, by the processing circuit, third-party content from the subset based in part on the predicted action metric that includes at least one of the predicted click-through rate or the predicted conversion rate, the predicted action metric associated with the third-party content; and
   providing, by the processing circuit, an indication of the selected third-party content to be presented by the client device in conjunction with the first-party content.

2. The method of claim 1, wherein the subset of third-party content eligible for selection is selected based in part on a match between a topic of the content in the subset and a topic of the first-party content.

3. The method of claim 1, wherein the predicted action metric is the predicted click through rate.

4. The method of claim 1, wherein the predicted action metric is the predicted conversion rate.

5. The method of claim 1, further comprising:
   monitoring whether the predicted online action occurred; and
   adjusting the prediction model based on the monitoring.

6. The method of claim 1, wherein the first-party content comprises an application executable by the client device.

7. The method of claim 1, wherein the indication comprises a command configured to cause the client device to retrieve the selected third-party content.

8. A system for selecting content, comprising a processing circuit operable to:
   receive a content selection request for third-party content to be presented by a client device in conjunction with first-party content, the content selection request including a client device identifier;
   retrieve data indicative of a set of one or more topical interest categories associated with the client device identifier;
   identify input values for a prediction model, the input values including:
      the set of topical interest categories,
      a click propensity metric associated with the client identifier, the click propensity metric indicative of how often the client device submitted clicks on previously selected third-party content, and
      a length of time each topical interest category has been associated with the client device identifier, wherein a length of time greater than a defined time period indicates a long-term topical interest category and a length of time less than the defined time period indicates a short-term topical interest category;
   perform one or more of image recognition or text recognition on each of a set of third-party content to determine a topical interest category;
   select a subset of third-party content eligible for selection based in part on the set of topical interest categories associated with the client device identifier, a topical interest category of each of the subset of third-party content, and a topic of first party content;
   use the prediction model that includes a logistic regression model to predict, based on the input values including the length of time, a predicted action metric for the third-party content in the subset, the predicted action metric corresponding to a predicted likelihood of an online action occurring as a result of the third-party content being selected, the logistic regression model indicating the predicted likelihood of the online action as $$f(z) = \frac{1}{1+e^{-z}},$$

wherein f(z) indicates the predicted likelihood of the online action, z indicates a set of factors including the length of time each topical interest category has been associated with the client device identifier, and wherein the predicted action metric includes at least one of a predicted click-through rate or a predicted conversion rate;

select third-party content from the subset based in part on the predicted action metric that includes at least one of the predicted click-through rate or the predicted conversion rate, the predicted action metric associated with the third-party content; and provide an indication of the selected third-party content to be presented by the client device in conjunction with the first-party content.

9. The system of claim 8, wherein the subset of third-party content eligible for selection is selected based in part on a match between a topic of the content in the subset and a topic of the first-party content.

10. The system of claim 9, wherein the entity extractor comprises a closed captioning decoder, and wherein the audience measurement server is further configured to determine that the identified search query corresponds to the identified entity responsive to the search query being included in a closed captioning transcript of the item of broadcast content.

11. The system of claim 8, wherein the predicted action metric is the predicted conversion rate.

12. The system of claim 8, wherein the processing circuit is further configured to monitor whether the predicted online action occurred and adjust the prediction model based on the monitoring.

13. The system of claim 8, wherein the first-party content comprises an application executable by the client device.

14. A non-transitory computer-readable storage medium having machine instructions stored therein, wherein the instructions, when executed by a processor, cause the processor to perform operations comprising:

receiving a content selection request for third-party content to be presented by a client device in conjunction with first-party content, the content selection request including a client device identifier;

retrieving data indicative of a set of one or more topical interest categories associated with the client device identifier;

identifying input values for a prediction model, the input values including:
the set of topical interest categories,
a click propensity metric associated with the client identifier, the click propensity metric being indicative of how often the client device submitted clicks on previously selected third-party content, and
a length of time each topical interest category has been associated with the client device identifier, wherein a length of time greater than a defined time period indicates a long-term topical interest category and a length of time less than the defined time period indicates a short-term topical interest category;

performing, by the processing circuit, one or more of image recognition or text recognition on each of a set of third-party content to determine a topical interest category;

selecting a subset of third-party content eligible for selection based in part on the set of topical interest categories associated with the client device identifier, a topical interest category of each of the subset of third-party content, and a topic of first party content;

using the prediction model that includes a logistic regression model to predict, based on the input values including the length of time, a predicted action metric for the third-party content in the subset, the predicted action metric corresponding to a predicted likelihood of an online action occurring as a result of the third-party content being selected, the logistic regression model indicating the predicted likelihood of the online action as $$f(z) = \frac{1}{1+e^{-z}},$$

wherein f(z) indicates the predicted likelihood of the online action, z indicates a set of factors including the length of time each topical interest category has been associated with the client device identifier, and wherein the predicted action metric includes at least one of a predicted click-through rate or a predicted conversion rate;

selecting third-party content from the subset based in part on the predicted action metric that includes at least one of the predicted click-through rate or the predicted conversion rate, the predicted action metric associated with the third-party content; and providing an indication of the selected third-party content to be presented by the client device in conjunction with the first-party content.

15. The non-transitory computer-readable storage medium of claim 14, wherein the subset of third-party content eligible for selection is selected based in part on a match between a topic of the content in the subset and a topic of the first-party content.

16. The non-transitory computer-readable storage medium of claim 14, wherein the predicted action metric is the predicted click through rate.

17. The non-transitory computer-readable storage medium of claim 14, wherein the instructions stored therein further include instruction that, when executed by a processor, cause the processor to perform operations comprising:
monitoring whether the predicted online action occurred; and
adjusting the prediction model based on the monitoring.

* * * * *